Oct. 21, 1969     R. W. FLANDERS     3,473,221
FOOD EXPULSION SPOON

Filed Aug. 28, 1967     2 Sheets-Sheet 1

INVENTOR.
RALPH W. FLANDERS
BY *M. A. Hobbs*
ATTORNEY

Oct. 21, 1969  R. W. FLANDERS  3,473,221
FOOD EXPULSION SPOON
Filed Aug. 28, 1967  2 Sheets-Sheet 2

INVENTOR.
RALPH W. FLANDERS
BY M. A. Hobbs
ATTORNEY

United States Patent Office 3,473,221
Patented Oct. 21, 1969

3,473,221
FOOD EXPULSION SPOON
Ralph W. Flanders, South Bend, Ind.
Filed Aug. 28, 1967, Ser. No. 663,579
Int. Cl. A47j 43/28
U.S. Cl. 30—141                                    1 Claim

ABSTRACT OF THE DISCLOSURE

A baby feeding spoon having a bowl portion with a flexible membrane extending across the recess therein and a handle having a bulb portion thereon for forcing air into the bowl portion to elevate the membrane to a position where the food in the spoon can be easily removed therefrom.

---

A spoon is often used to feed cereal, ground meat and vegetables and other semi-solid substances to babies. These foods tend to adhere to the spoon and can be removed from the spoon while feeding only by tipping the handle of the spoon upwardly and sliding the spoon outwardly along the lower part of the baby's upper gum. This method is not only often ineffective in removing the material from the spoon, requiring an unduly long time to feed the baby, but sometimes irritates or otherwise injures the gum. Further, since the baby cannot bite, the food removed from the spoon in this manner is frequently deposited on the gum or between the gum and the upper lips and even in the nostrils, thus making it difficult or impossible for the baby to ingest the food and move it to the rear of the mouth for swallowing. Other utensils, such as a fork, are neither safe nor suitable since the food is often sufficiently moist that it cannot be effectively handled by the spaced tines without slipping or dripping therefrom. It is therefore one of the principal objects of the present invention to provide a spoon or spoon-like instrument which will hold and effectively retain liquid and semi-solid food therein while it is being inserted in the baby's mouth, and which places the food in a position for easy removal from the spoon by the baby.

Another object of the invention is to provide a relatively simple spoon-like instrument which can be used as effectively as a conventional spoon for various foods and under various feeding conditions, and which can be operated to discharge the food when the food is of such consistency that it will not easily flow or slide from the instrument while it is in the baby's mouth.

Still another object of the invention is to provide a spoon for feeding babies, which holds the food in the same manner as a conventional spoon until it is inserted in the baby's mouth and which then changes its shape to elevate the food so that the food can be easily scraped or slip off the spoon into the mouth.

A further object to to provide a spoon of the aforesaid type which permits easy and effective control of the food ingestion and which can be rapidly operated between the food carrying and the food discharge positions by a simple manipulattion of the spoon handle with merely the thumb and one finger.

Additional objects and advantages of the invention will become apparent from the following description and accompanying drawings, wherein.

Figure 1:
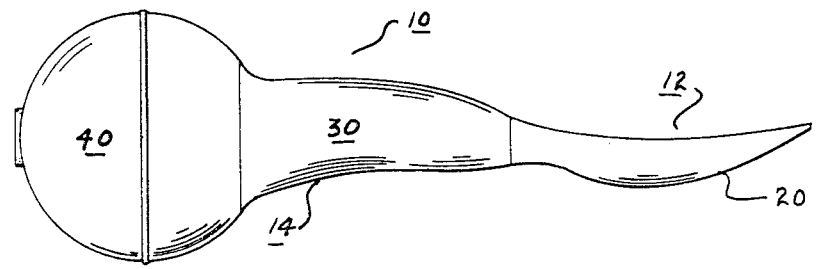
FIGURE 1 is a side elevational view of the present baby spoon.

Referring more specifically to the drawings, numeral 10 designates generally the present spoon having an oval shaped bowl portion 12 and a handle portion 14 connected to one end of the bowl portion. The bowl portion is constructed of a rigid part 16, preferably of metal or rigid plastic material, and is of the same general shape as the bowl portion of a conventional spoon with an oval recess 18 in the upper side thereof. The rigid metal or plastic part 16 is enclosed in a rubber or plastic sleeve 20 which extends across recess 18 and, in one position, conforms firmly to both the upper and lower sides of rigid part 16 so that the shape of the bowl portion with the sleeve thereon conforms closely to the configuration of the rigid part. The rubber or plastic sleeve is of relatively thin material and is flexible and preferably resilient so that it will fit tightly on the rigid part and be capable of flexing during the mechanical operation of the spoon. The operating part of the sleeve is the upper side 24 which extends over and across recess 18 from the upper edges of rigid part 16 and will be referred to herein as a "membrane."

In the embodiment of the invention illustrated in the drawings, the handle 14 consists of a generally cylindrical hollow stem portion 30 joined at the end portion 32 to bowl portion 12. The area between the upper side of rigid part 16 and the inner surface membrane 24 of sleeve 20 is connected to the hollow interior of stem 30 by a passage 34 to permit air to flow into and from the recess between rigid part 16 and membrane 24. Mounted on the free end of stem 30 is a compressible bulb 40, preferably formed of rubber or plastic and joined firmly and in sealed relation to the walls of stems 30. The bulb communicates with the hollow interior of stem 30 and with passage 34 and is constructed in such a manner that it can be easily compressed and yet return to its original generally spherical shape when released. Stem 30 is relatively rigid and stiff and is joined firmly to the bowl portion 12, so that the two portions form a substantially rigid structure, permitting the stem to be used as an effective handle for the bowl portion without flexing when the spoon is used. Likewise, the bulb is sufficiently firm that the spoon can be used by merely grasping the bulb between the thumb and a finger. When bulb 40 is compressed, air contained therein is forced or expelled therefrom through the hollow interior of stem 30 and through passage 34 into the area between the upper surface of rigid part 16 and the under side of membrane 24. As the bulb is squeezed or compressed further, the air therefrom causes membrane 24 to rise, thus shifting the membrane from the position shown in FIGURE 4 to the position shown in FIGURE 5, with the center thereof slightly elevated above the sides of the upper edge of the rigid part 16. As the air lifts the membrane, any food in recess 18 is lifted therefrom to a position where it can be easily removed from the bowl portion.

Figure 7:
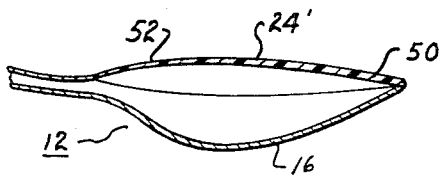
FIGURE 7 is a fragmentary vertical cross sectional view showing a modified structure of the present spoon.

While the membrane 24 may be of uniform thickness throughout, the positioning thereof in its raised or extended position can be controlled by the selection of thicker and thin sections. This type of construction is illustrated in FIGURE 7 in which the forward end 50 of the membrane 24′ is relatively thick and the rearward end 52 is relatively thin. When it is raised by the air from bulb 40, the thinner section tends to rise more rapidly and in advance of the thicker forward section, thereby causing the food contained in the bowl portion to be urged forwardly for easy removal from the elevated membrane. Various configurations in the cross sectional structure of the membrane may be used to obtain effective operation of the membrane by the air forced from the bulb, and to give the upper surface of the membrane a desired or optimum shape when the membrane is raised to the food removal position.

Figure 2:
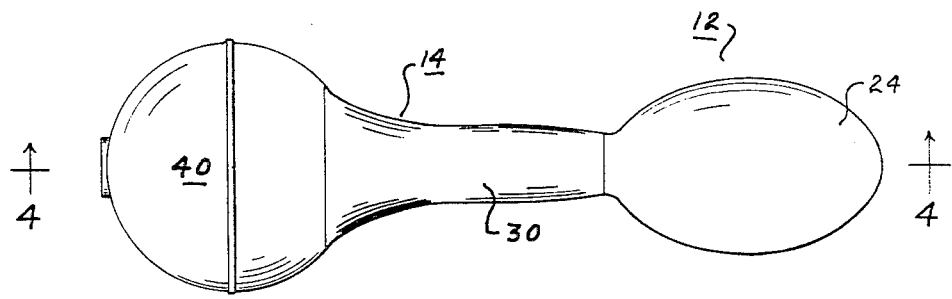
FIGURE 2 is a top plan view of the spoon shown in FIGURE 1.
Figure 3:
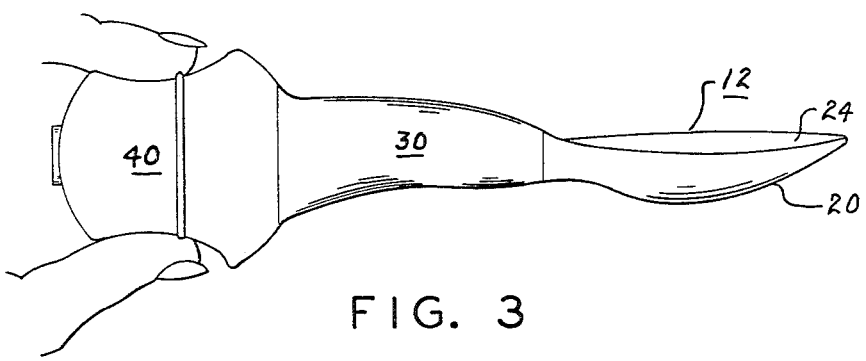
FIGURE 3 is a side elevational view of the spoon, illustrating the manner in which it is used.
Figure 4:
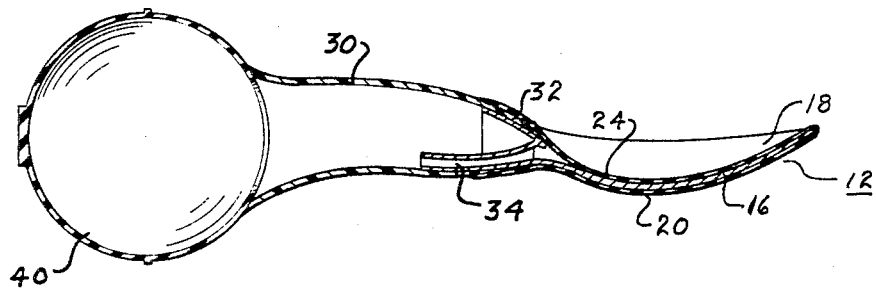
FIGURE 4 is a vertical cross sectional view of the spoon, the section being taken on line 4—4 of FIGURE 2.
Figure 5:
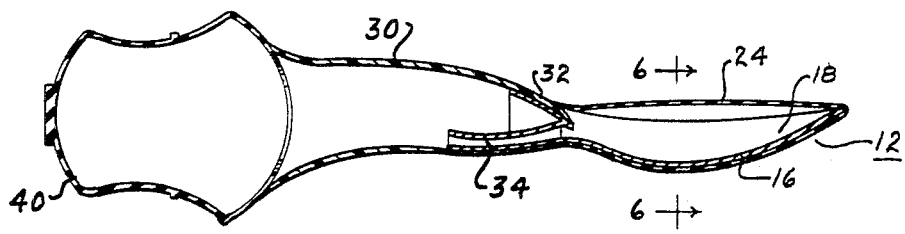
FIGURE 5 is a vertical cross sectional view similar to that shown in FIGURE 4, illustrating the manner in which the spoon is used in operation.
Figure 6:
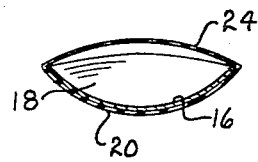
FIGURE 6 is a vertical cross sectional view taken on line 6—6 of FIGURE 5.

In the use of the present spoon, starting in the position illustrated in FIGURES 1, 2, and 4, the bowl portion is dipped into the food to fill recess 18. The bowl portion is then inserted in the baby's mouth with the contents thereof preferably slightly behind the baby's upper gum. With the spoon in this position, bulb 40 is pressed, causing the air therein to flow through stem 30 and passage 34 into the recess 18 between the upper surface of rigid part 16 and membrane 24, thus lifting the membrane from the position shown in FIGURE 4 to the position shown in FIGURE 5, and thereby lifting the food in the recess and placing it on a substantially even plane with the upper edge of rigid part 16. The food in this position can thereafter easily be removed by merely withdrawing the spoon from the baby's mouth.

While the bowl portion is shown with sleeve 20 over the entire rigid part 16, it can be formed effectively by a single membrane extending across the recess 18 and joined at its upper edges to the rigid portion 16, thus eliminating the part of the sleeve on the under side of the rigid part. The membrane must be sufficiently flexible and resilient to preferably retract fully into the recess formed by rigid part 16 and to expand to at least substantially on a plane with the upper edges of the rigid part 16, thus providing a smooth, substantially straight flat surface so that the food in the spoon can be easily scraped therefrom.

One of the advantages of the present spoon is that the membrane will retract promptly after the food has been deposited in the baby's mouth, thus forming the original bowl to catch any food the baby may spit out after the spoon is withdrawn. Further, in any situation this spoon can be used as a conventional spoon and can be cleaned and handled in the same manner.

The construction of the spoon may be changed to various configurations of the bowl portion, and the stem and bulb structure may be of different shapes with the bulb being designed to conform more closely to the shape of the stem portion, as long as sufficient air can be forced therefrom to elevate membrane 24 when food is to be removed from recess 18 of the bowl portion. While only one embodiment has been described, further modifications may be made without departing from the scope of the invention.

I claim:

1. A baby feeding spoon comprising a bowl portion having walls forming a rigid part defining a recess for holding food therein, a stem connected at one end to said bowl portion and extending away therefrom, a bulb mounted on said stem, a sleeve extending over said bowl portion and having a membrane enclosing the recess in the bowl portion and being movable from a food holding position to a food discharge position, and a conduit connecting said bulb with said recess in the area between said walls and said membrane for supplying fluid to move said membrane to said discharge position.

References Cited

UNITED STATES PATENTS

| 2,252,119 | 8/1941 | Edmonds | 30—123.3 |
| 2,295,847 | 9/1942 | Hume | 30—328 |
| 3,116,152 | 12/1963 | Smith | 30—123.3 X |

FOREIGN PATENTS

| 78,604 | 5/1951 | Norway. | |

MYRON C. KRUSE, Primary Examiner